(12) United States Patent
Hanebutte et al.

(10) Patent No.: US 12,124,827 B1
(45) Date of Patent: Oct. 22, 2024

(54) METHOD AND SYSTEM TO EXPAND ACCESSIBLE ON-CHIP MEMORY (OCM) OF AN INFERENCE ENGINE

(71) Applicant: Marvell Asia Pte Ltd, Singapore (SG)

(72) Inventors: Ulf Hanebutte, Gig Harbor, WA (US); Senad Durakovic, Palo Alto, CA (US); Mohana Tandyala, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 202 days.

(21) Appl. No.: 17/966,380

(22) Filed: Oct. 14, 2022

Related U.S. Application Data

(60) Provisional application No. 63/317,118, filed on Mar. 7, 2022.

(51) Int. Cl.
*G06F 8/41* (2018.01)
*G06F 3/06* (2006.01)
*G06N 5/04* (2023.01)

(52) U.S. Cl.
CPC .............. *G06F 8/453* (2013.01); *G06F 3/061* (2013.01); *G06F 3/0659* (2013.01); *G06F 3/0673* (2013.01); *G06N 5/04* (2013.01)

(58) Field of Classification Search
USPC .................................................. 717/140–161
See application file for complete search history.

(56) References Cited

U.S. PATENT DOCUMENTS

| | | | |
|---|---|---|---|
| 11,467,992 B1* | 10/2022 | Kaplan | G06N 3/045 |
| 11,977,475 B1* | 5/2024 | Chou | G06F 11/3624 |
| 2019/0018785 A1* | 1/2019 | Beard | G06F 12/0653 |
| 2019/0180170 A1* | 6/2019 | Huang | G06N 3/044 |
| 2019/0180183 A1* | 6/2019 | Diamant | G06N 3/06 |
| 2020/0285579 A1* | 9/2020 | Chen | G06F 12/0842 |
| 2021/0240611 A1* | 8/2021 | Tumanova | G06F 3/061 |

* cited by examiner

*Primary Examiner* — Qing Chen

(57) ABSTRACT

A method includes determining that an amount of data external to an inference engine to be transmitted for local storage/processing by a first processing tile exceeds an available space at a first OCM of the first processing tile; receiving a first portion of the data at the first processing tile; transmitting the first portion of the data to a second OCM of a second processing tile for temporary local storage (the second processing tile is within the inference engine); receiving and storing a second portion of the data at the first OCM; processing the second portion of the data at the first processing tile by at least a first processing element; receiving and storing the first portion of the data at the first OCM of the first processing tile from the second processing tile prior to the first portion of data is needed by the first processing tile.

20 Claims, 4 Drawing Sheets

METHOD AND SYSTEM TO EXPAND ACCESSIBLE ON-CHIP MEMORY (OCM) OF AN INFERENCE ENGINE

RELATED APPLICATION

This application is a nonprovisional application and claims the benefit and priority to a provisional application No. 63/317,118 filed on Mar. 7, 2022, which is incorporated herein by reference in its entirety.

BACKGROUND

Use and implementations of machine learning (ML) and artificial intelligence (AI) methods on electronic devices has become ubiquitous. The design of a hardware architecture of an electronic device, which can be but is not limited to a processor, a programmable logic, an application specific integrated circuit (ASIC), or a dedicated ML-specific hardware, often goes through various optimization and compilation processes.

A compilation process or a compiler generates low-level executable instructions (in binary) from one or more high-level code and identifies hardware resources to execute the low-level executable instructions. The compilation process may include quantization, reduction in mathematical precision, mapping of the application (e.g., a neural network) to a specific number of processing tiles of the hardware, wherein each processing tile has one or more processing unit and on-chip memory (OCM). In general, the compiler maps data, e.g., the network tensor weight, the network tensor bias constants, the network tensor input and output for each network layer, etc., to particular memories and generates the executable code associated therewith. For example, the compiler decides on which processing tile and which processing unit (e.g., POD and/or PE) of the processing tile of a multi-core system will be processing certain data.

Placement of data, e.g., tensor data, as determined by the compiler, has significant impact on performance due to latency and/or throughput. Data access to a local memory component, e.g., OCM within a given processing tile, may have a higher bandwidth and a lower latency in comparison to accessing data from an external storage unit, e.g., a double data rate (DDR) memory. As such, once the compiler identifies a resource, e.g., a processing tile, then the data to be processed by that processing tile is generally transmitted to that processing tile's OCM for local storage in order to reduce the latencies.

Unfortunately, the OCM size for a given processing tile is limited and the amount of data has increased substantially, e.g., due to larger Machine Learning (ML) model. Accordingly, the amount of data that may need to be locally stored on a given OCM of a given processing tile may exceed its available storage capacity. Thus, the processing tile obtains the data that exceeds the OCM size from external storage, e.g., a DDR memory, which has a lower bandwidth and a higher latency, resulting in reduced performance.

Moreover, it is appreciated that while an OCM of a given processing tile may have reached its maximum allowable capacity, another OCM of a different processing tile may have available storage capacity that is not being utilized. As such, underutilization of an OCM of processing tiles results in a lower bandwidth and a higher latency since the processing tile needs to obtain the data that exceeds the OCM size from external storage, e.g., DDR memory.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
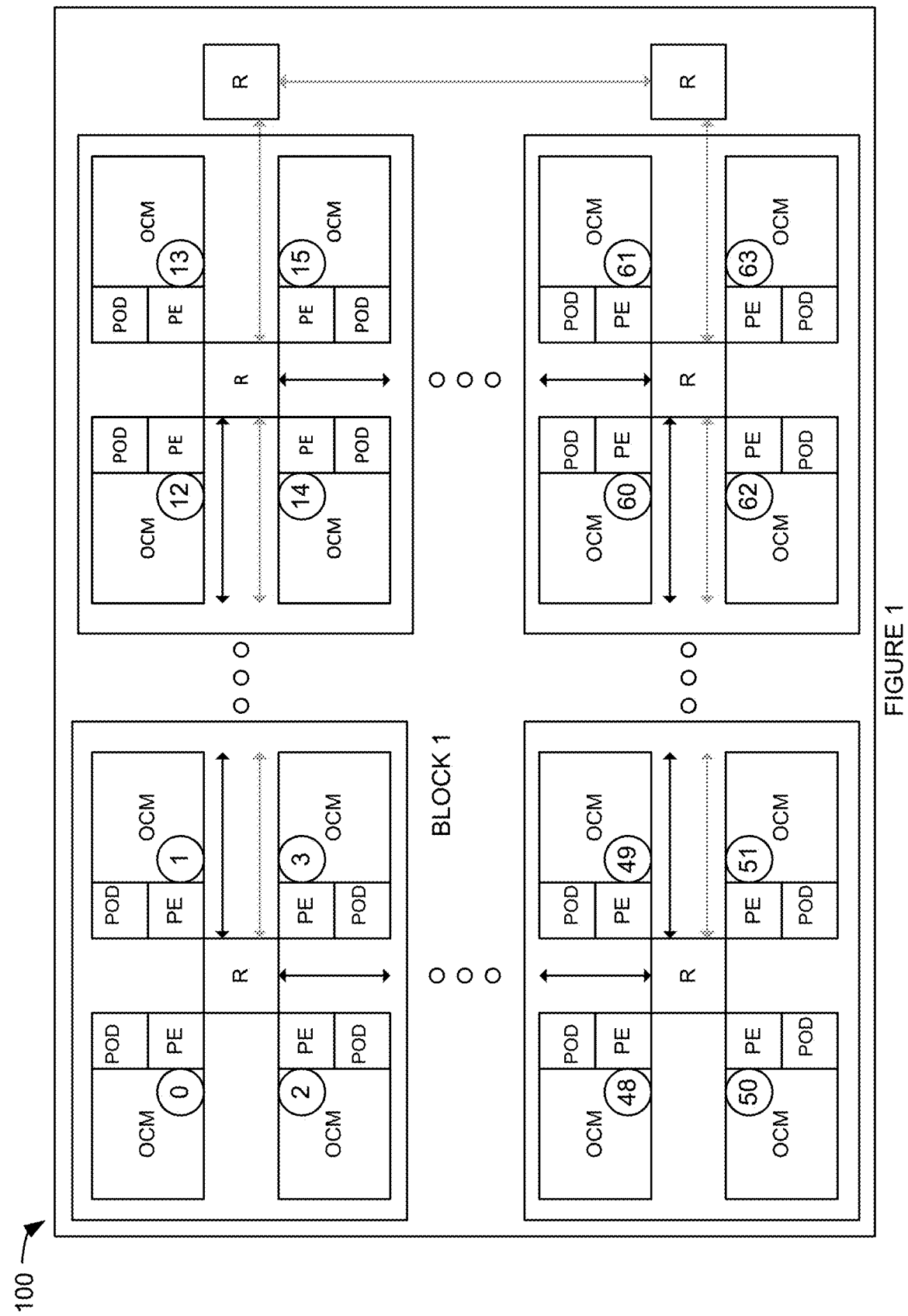
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Many ML operations/commands, e.g., SoftMax, ArgMax, TopK, GEMM, SUM, MUL, etc., may be performed by an ML hardware (or accelerator or inference engine) having a plurality of processing tiles that enables data to be processed in a much faster fashion in comparison to the sequential processing of a single processing element, thereby improving the processing speed. Leveraging multiple processing tiles addresses inadequacies associated with data movement between OCM memory that are local memory, e.g., SRAM, and external memory such as DDR because a large data set is broken down to smaller data sets, which can be processed by each processing tile locally without a need to access the external memory once the data is stored locally.

Specifically, the core, e.g., host or host central processing unit (CPU), is configured to divide the plurality of ML commands between the core and the inference engine for efficient execution thereof. The ML commands, e.g., Soft- Max, TopK, ArgMax, etc., are compiled by the compiler into a plurality of instruction set architecture (ISA) instructions designed for, for a non-limiting example, a specialized ML hardware and efficient data processing for ML operations, and the relevant data associated with the ISA instructions are transmitted for execution to the inference engine from the core and the memory to the instruction-streaming engine and the data-streaming engine for efficient streaming to the inference engine. The data and instruction steaming engines are configured to send one or more data streams, e.g., data sub-vectors to be operated on by the plurality of processing elements, and ML commands that are compiled, e.g., ISA instructions corresponding to SoftMax, TopK or ArgMax, to the inference engine in response to the received programming instructions from the core.

It is appreciated that a compiler generates the low-level executable code for each processing tile, e.g., mapping of data to memory blocks, precision, orientation, split across distributed blocks, quantization, mapping of data to a particular processing tile and/or processing element within a processing tile to perform a particular task/instruction, dimension reordering, copying across processing tiles, etc. It is appreciated that a compiler considers many factors when deciding on mapping of data and resource allocation, e.g., reducing data movement, reducing storage, reducing duplicate computations, reducing communication by duplicating computing if beneficial, reducing data conversions, etc.

For a non-limiting example, the inference engine may include 64 processing tiles (each processing tile may further include a plurality of smaller processing elements PE and POD that are described in the U.S. patent application Ser. No. 16/226,508, filed Dec. 19, 2018 that is incorporated herein by reference in its entirety). Each of those processing tiles is configured to receive a sub-vector and an instruction (i.e., compiled SoftMax instructions, ArgMax instruction, etc.). As such, multiple sub-vectors may be operated on simultaneously, thereby reducing the processing time. For illustrative purposes, it is assumed that there are 64 processing tiles where each processing element is configured to process 64 elements. However, it is appreciated that any number of processing tiles may be used. Unfortunately, the size of data to be processed by a processing tile, say processing tile 0, may exceed the available memory storage in its OCM while another processing tile, e.g., processing tile 11, may have underutilized OCM.

A new approach is proposed to achieve a higher utilization of OCM(s) of processing tiles, thereby reducing latency and improving throughput. In some embodiments, a compiler may determine that the amount of data to be processed by one processing tile exceeds its available space in its OCM. Accordingly, the compiler may cause the data that exceeds the capacity of the OCM of the one processing tile to be temporarily stored in an OCM of a different processing tile if its OCM has available space to accommodate the data of the one processing tile that does not have enough storage space. Thus, the data that is temporarily stored in the OCM of a different processing tile may be accessed when needed, thereby reducing the latency associated with access to external memory, e.g., a DDR memory.

It is appreciated that the embodiments are described with respect to memory allocation for illustrative purposes but should not be construed as limiting the scope of the embodiments. For example, a similar approach may be applied to allocating processing resources within an inference engine of an ML hardware, to support deep-learning networks, etc.

Although an ISA is used as a non-limiting example of the low-level instruction format to illustrate the proposed approach in the embodiments described below, it is appreciated that the same or similar approach is equally applicable to other types of low-level instructions. It is also appreciated that an ML hardware is used as a non-limiting example of the hardware where the low-level instructions are executed to illustrate the proposed approach in the embodiments described below. Moreover, it is appreciated that an ML-related operation or function is used as a non-limiting example of the application of the high-level code to illustrate the proposed approach in the embodiments described below, it is appreciated that the same or similar approach is equally applicable to other types of software applications including, but not limited to, firmware, hardware simulation software, or register transfer level (RTL) simulation software, to support the compiler generating a metadata.

The proposed ML hardware architecture is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

In the example of FIG. 1, the ML-specific hardware 100 is a dedicated hardware, including one or more microprocessors and/or OCM units storing the data and/or the set of low-level instructions compiled from the high-level code by the compiler to perform one or more ML operations, e.g., SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2:
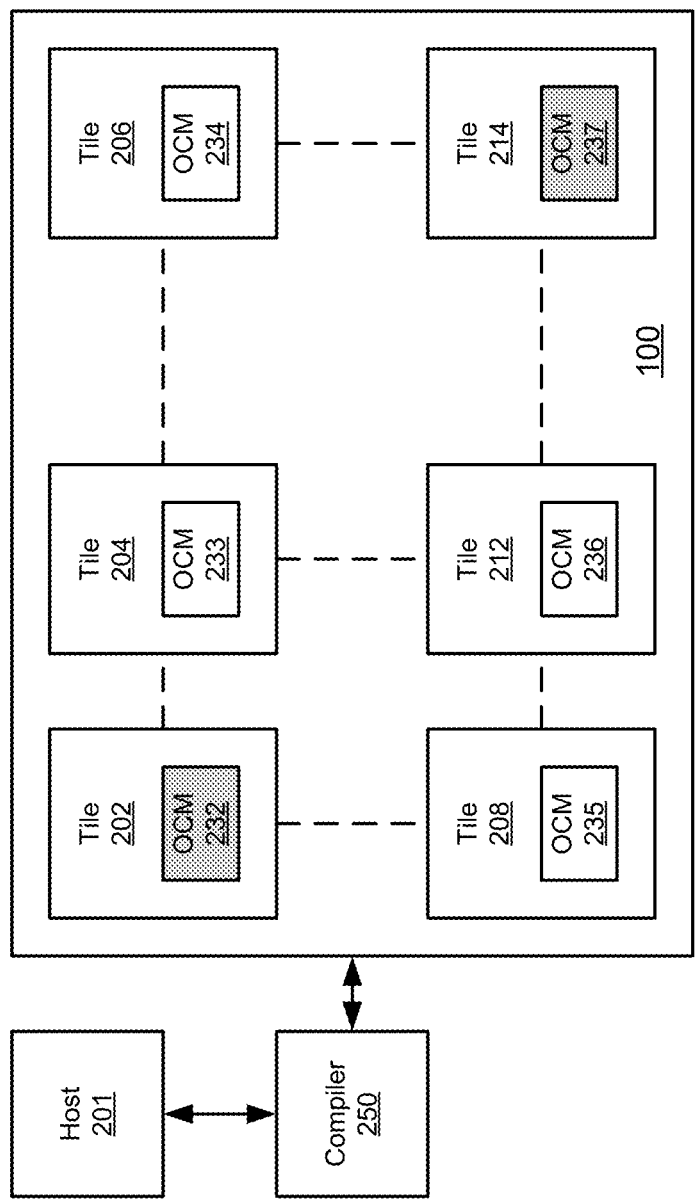
FIG. 2 depicts an example of a compiler configured to increase utilization of underutilized resources of a processing tile according to one aspect of the present embodiments.

Since the architecture and operation of various components within an ML hardware has been described, an example of a compiler configured to increase utilization of underutilized resources of a processing tile according to one aspect of the present embodiments is shown in FIG. 2. It is appreciated that the compiler may be ahead of time (AOT) compiler or it may be a just in time (JIT) compiler. In AOT compilation, the compiler may be a separate entity that generates a binary code that is stored for later access.

As shown by the example of FIG. 2, compiler 250 is coupled to a host 201, e.g., a central processing unit (CPU), a core, etc., and is configured to accept a high-level code of an application (e.g., an ML operation) from the host 201. It is appreciated that in some embodiments, the high-level code includes a plurality of high-level functions/operators each called at one or more lines in the high-level code. The compiler 250 is configured to compile each high-level function/operator in the high-level code into a set of low-level instructions to be executed on the ML hardware 100, as described in FIG. 1. It is appreciated that each set of the low-level instructions is uniquely identified and associated with the high-level function. It is appreciated that the ML hardware 100 is provided for illustrative purposes and should not be construed as limiting the scope of the embodiments. For example, any type of hardware-based system configured to execute low-level instructions may be used.

Here, the high-level code is a software code written through a commonly-used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library. For a non-limiting example, the compiler 250 may call a library function to perform a matrix-matrix-multiplication of two matrices of given sizes and the ML library returns the set of low-level instructions that are needed to perform this library function, wherein the set of low-level instructions includes one or more of loading data from a memory (e.g., OCM) into registers, executing dot-product, and storing the data back into the memory.

In some embodiments, the set of low-level instructions are in the format of ISA designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 100, the set of low-level instructions in the ISA format program the ML hardware 100 by one or more of: (i) programming one or more input data streams to the ML hardware 100; (ii) programming one or more operations to be performed on the input data streams; and (iii) programming one or more output data streams from the ML hardware 100.

In order to generate the low-level instructions from high-level functions/code, the compiler 250 having knowledge of the ML hardware 100 architecture and software/system requirements makes certain decisions and performs certain operations in order to generate low-level instructions that are as efficient and as optimized as possible (e.g., from hardware perspective and/or software perspective). For example, the compiler 250 may take certain actions and make certain decisions to reduce data movement, to reduce data conversions, to reduce storage usage, to reduce computation (or duplication of computation), to reduce communication (by duplicating compute if beneficial), etc. In some nonlimiting examples, the compiler 250 may determine the manner of which to reserve DDR (external to the ML hardware 100) and/or OCM memory regions for full or partial tensors to avoid read write data hazards (i.e., data corruption due to unintentional address reuse for optimization that has reused addresses), manner by which perform serialization, and manner by which to reduce data movement, etc. It is also appreciated that in some embodiments, the compiler 250 may determine the manner of which to reserve DDR and/or OCM memory regions for full or partial tensors, to perform serialization and to reduce data movement. In some non-limiting examples, the compiler 250 may pipeline ISA tasks running on the same tile but different processing elements (i.e., PE versus POD) or on different tiles as determined from space-time analysis based on data allocations.

In this nonlimiting example, the ML hardware 100 includes processing tiles 202, 204, 206, 208, 212, and 214 (similar to the processing tiles of FIG. 1). Each processing tile may include its own designated OCM. For example, Processing tile 202 includes its own OCM 232, processing tile 204 includes its own OCM 233, processing tile 206 includes its own OCM 234, processing tile 208 includes its own OCM 235, processing tile 212 includes its own OCM 236, and processing tile 214 includes its own OCM 237. It is appreciated that each processing tile may also include one or more processing elements (not shown), e.g., PE, POD, etc., as described above in FIG. 1. It is appreciated that the number of processing tiles and the number of OCMs are for illustrative purposes only and should not be construed as limiting the scope of the embodiments.

Once the set of low-level instructions has been compiled from each high-level function, the compiler 250 is configured to stream the set of low-level instructions as well as data received from the host for the application to the ML hardware 100 for execution. In the example of FIG. 2, the ML hardware 100 is a dedicated hardware block/component including one or more microprocessors and/or OCM units storing the data and/or the set of low-level instructions compiled from the high-level code performing one or more ML operations. For a non-limiting example, the ML hardware 100 can be but is not limited to an inference engine, which is configured to infer and identify a subject for the application via inference from trained data. At runtime, the ML hardware 100 is configured to retrieve the set of low-level instructions and/or data received from the compiler 250 and execute the set of low-level instructions to perform the high-level application/ML operation according to the set of low-level instructions. It is appreciated that the compiler 250 may perform AOT compilation or JIT compilation.

In some nonlimiting examples, the compiler 250 allocates resources, e.g., processing tiles and respective processing elements within each processing tile, OCM space within a particular processing tile, etc., to perform one or more operations on the data received from the host 201. In one nonlimiting example, the compiler 250 performs AOT compilation, which compiles the instructions before runtime, while inference on the ML hardware 100 accelerators and/or other processing units (e.g., CPU) run in real time.

In this nonlimiting example, the compiler 250 may designate the OCM 232 of the processing tile 202 to locally store data do (which may exceed the available space in OCM 232) and for its processing elements to process data $d_0$. Similarly, the compiler 250 may designate OCM 237 of the processing tile 214 to locally store data $d_1$ and for its processing elements to process data $d_1$. In one nonlimiting example, the compiler 250 determines through AOT compilation that, during a period $t_0$-$t_1$, the amount of data in data $d_0$ (having data portions $d_{01}$ and $d_{02}$) exceeds the available space in the OCM 232, resulting in increased latencies and performance degradation. For example, the compiler 250 may determine that data portion doz exceeds the available space in the OCM 232. The compiler 250 may also determine through AOT compilation that the OCM 237 of the processing tile 214 is being underutilized, e.g., by being idle, or being underutilized (e.g., the OCM 237 having extra space after storing $d_1$), etc., during the period $t_0$-$t_1$. In other words, the compiler 250 determines that OCM 237 has enough extra space available that can accommodate the data that does not fit within the OCM 232, e.g., data $d_{02}$. As such, the compiler 250 determines that data portion $d_{01}$ is to be stored in the OCM 232 and that data portion $d_{02}$ is to be temporarily stored in the OCM 237 of processing tile 214 for later use by the processing tile 202. It is appreciated that temporarily storing a data portion in a different processing tile may still reduce latencies in comparison to having to access the data from external resources, e.g., DDR, to the ML hardware 100.

It is appreciated that in some embodiments, the data portion $d_{01}$ is stored in the processing tile 202 while data portion $d_{02}$ is temporarily stored in a different processing tile, e.g., processing tile 214. The OCM 237 of the processing tile 214 may also store data $d_1$ designated for processing by its processing tile 214. The processing tile 202 may operate on the data portion $d_{01}$ and unneeded data from the OCM 232 may be purged to free up space to locally store data portion $d_{02}$. Once enough space is made available in the OCM 232, data portion $d_{02}$ that was temporarily stored in the OCM 237 of the processing tile 214 is sent to be locally stored in the OCM 232 of the processing tile 202. As such, the processing tile 202 may now operate on the data portion $d_{02}$.

It is appreciated that the example described above with respect to two processing tiles is for illustrative purposes only and should not be construed as limiting the scope of the embodiments. For example, more than two processing tiles may be involved and extra data portions that cannot be locally saved in the OCM 232 may be distributed for temporary storage in two or more OCMs of two or more processing tiles different from the processing tile 202. Moreover, it is appreciated, that a given processing tile may temporarily store extra data from two or more processing tiles. For example, the OCM 237 of the processing tile 214 may temporarily store extra data from processing tiles 202 and 204 if it has enough space to accommodate them. It is appreciated that the description of temporarily storing excess data (e.g., overflow data) from an OCM of one tile in an OCM of another processing tile is for illustrative purposes and the embodiments should not be construed as limited thereto. For example, data for two processing tiles may temporarily be stored in a third processing tile or excess data from one processing tile may be temporarily stored in the OCM of two different tiles, or temporarily data from one tile stored on a different processing tile is later used by multiple processing tiles.

It is appreciated that the example above described the operation of the compiler 250 with AOT compilation for illustrative purposes. However, the embodiments should not be construed as limited thereto. For example, compilation other than AOT may be used, e.g., runtime compilation (also known as JIT).

It is appreciated that in AOT compilation or in JIT compilation, data may be pushed, pulled, or a combination of push/pull, between different processing tiles. In a push model, as an example, the compiler 250 has knowledge when processing on different data portions and different processing tiles and OCMs are going to be performed. As such, data may be pushed to different OCMs of processing tiles before that data is needed without a need for one processing tile to request that data. In a push model, each tile may have read/write access to its local OCM, e.g., processing tile 202 can read/write into its own OCM 232, while it can write data to OCM of a different tile, e.g., processing tile 202 can write data into OCM 237 of the processing tile 214. It is appreciated that data may be written to a single processing tile, or it may be broadcast to more than one processing tile resulting in copies of the data being written to multiple processing tiles.

In a pull model, as an example, the data portion when needed may be pulled by a processing tile from an OCM of a different processing tile. In a pull model, each tile may have read/write access to its local OCM, e.g., processing tile 202 can read/write into its own OCM 232, while it can read data from OCM of a different tile, e.g., processing tile 202 can read data from OCM 237 of the processing tile 214.

It is appreciated that in some embodiments, a combination of pull/push may be used. In a pull/push model, each processing tile can not only read/write to its own local OCM, but it can also access, e.g., read/write, OCMs of other processing tiles.

Figure 3:
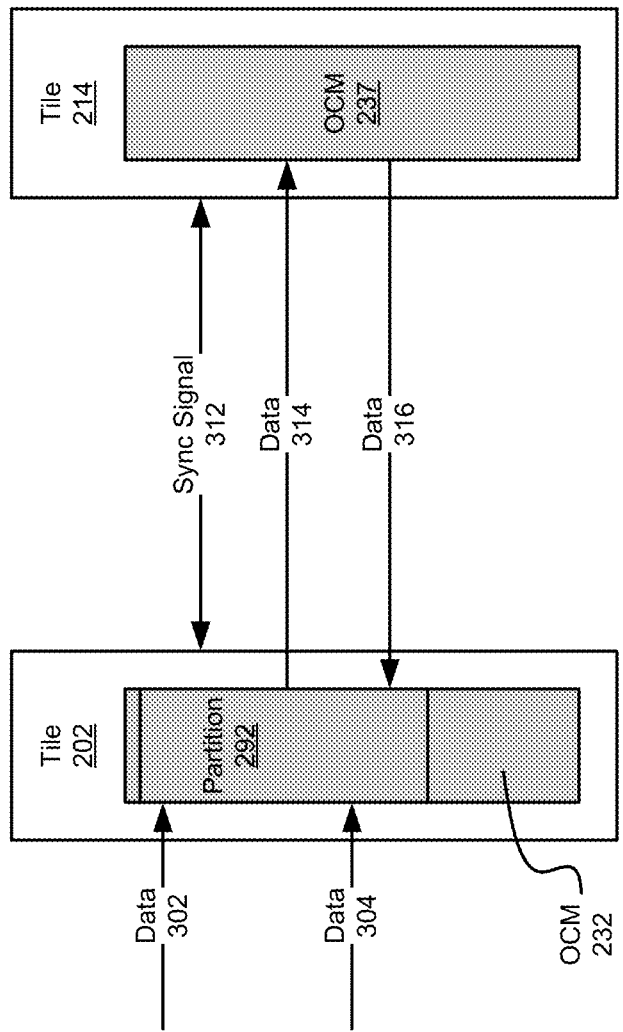
FIG. 3 depicts an example communication between processing tiles to increase utilization of an underutilized processing tile according to one aspect of the present embodiments.

FIG. 3 depicts an example communication between processing tiles to increase utilization of an underutilized processing tile according to one aspect of the present embodiments. In this example, a push model (in an AOT or JIT compilation) to increase utilization of an OCM of a processing tile that is being underutilized is described.

It is appreciated that the processing tile 202 may include the OCM 232, as described above. The OCM 232 may be partitioned such that partition 292 locally stores the data that is needed by the processing elements of the processing tile 202. Through AOT compilation, the compiler 250 has determined that the OCM 232 of the processing tile 202 does not have enough space to locally store the entire data that is needed for processing while it has determined that the OCM 237 of the processing tile 214 is being underutilized and that it can accommodate the data overflow from processing tile 202. In this example, data 302 may be received at time to for local storage in partition 292. At time $t_1$, a synchronization signal 312 may synchronize the processing tiles 202 and 214 such that data that cannot be locally stored in the OCM 232 can be transmitted (pushed) to the OCM 237 for temporary storage. As such, at time $t_2$, data 314 that is the data that exceeds the available space in the OCM 232 or exceeds the available space in the partition 292, is transmitted (pushed) from OCM 232 to OCM 237 for temporary storage. As such, partition 292 frees up space to store the rest of the data 304 which is received at partition 292 of the OCM 232, at time $t_3$. The processing tile 202 processes the data in the partition 292 and the unneeded data is purged to free up space such that the data 314 that was temporarily stored in OCM 237 can be sent back (pushed) to the OCM 232 for local storage and to be processed. At time $t_4$, data 316 (which may be the same as data 314) is received by partition 292 of the OCM 232 for local storage. In some embodiments, the data that was temporarily stored in OCM 237 is purged to free up space in OCM 237 for other data storage (e.g., temporary data storage for other processing tiles or for local data storage for the processing tile 214). In some embodiments, the purging of data frees up space and it occurs after time $t_4$ when data 316 has been received by partition 292.

It is appreciated that FIG. 3, has been described with AOT compilation where the data is being pushed. In the AOT compilation, the compiler 250 has knowledge of when different data portions are needed by each resource allocation, etc., and as such each component can push the relevant data as needed without the data being requested by the component that needs the data. However, as described above, other schemes to transmit data may also be used, e.g., pull model, pull/push model, etc. In some nonlimiting examples, the compiler may insert one or more synchronization steps for proper execution flow and to ensure data integrity.

Figure 4:
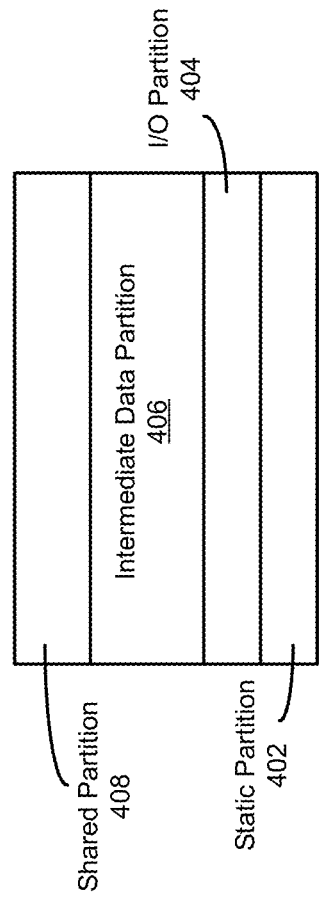
FIG. 4 depicts an example of partitioning of an OCM of a processing tile according to one aspect of the present embodiments.

FIG. 4 depicts an example of partitioning of an OCM 232 of a processing tile 202 according to one aspect of the present embodiments. In this example, the OCM 232 may have 1 MB space and may be partitioned into four sections. Static partition 402 may store static constants such as network tensor weights. Input/Output (I/O) partition 404 may store data associated with input and output of each network layer. Intermediate data partition 406 may store intermediate data during processing of data, and shared partition 408 may store data for temporary storage for other processing tiles, e.g., for processing tiles 204, 206, 208, 212, 214, etc. It is appreciated that the shared partition 408 may be associated with and designated to temporarily store overflow data from other processing tiles, similar to OCM 237 storing overflow data from processing tile 202. It is appreciated that the partitioning of the OCM may be dynamic and managed by the compiler 250 or runtime. For example, while one processing tile with an OCM may have a shared partition 408, another OCM of a different processing tile may not have the shared partition. Moreover, the amount of space allocated for each partition may vary from one processing tile to a different processing tile. In one nonlimiting example, if a processing tile is idle then it does not participate in data processing, as such, its entire OCM may be used as shared partition to accommodate overflow data from other processing tiles, if needed.

Figure 5:
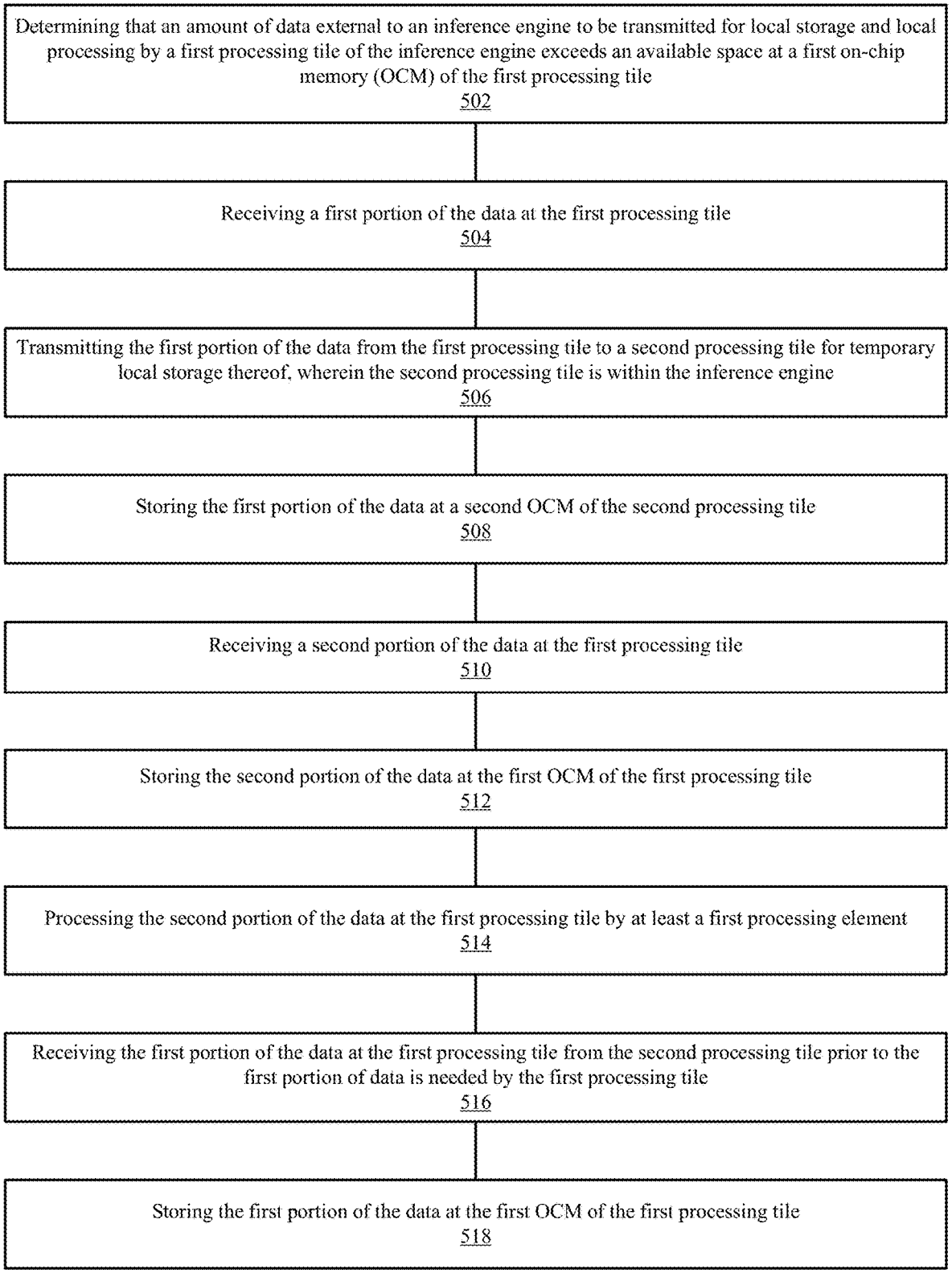
FIG. 5 depicts a flowchart of an example of a process to increase utilization of resources of an underutilized processing tile within an ML hardware according to one aspect of the present embodiments.

FIG. 5 depicts a flowchart of an example of a process to increase utilization of resources of an underutilized processing within an ML hardware according to one aspect of the present embodiments. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

At step 502, it is determined that an amount of data external to an inference engine to be transmitted for local storage and local processing by a first processing tile of the inference engine exceeds an available space at a first on-chip memory (OCM) of the first processing tile. In some nonlimiting example, the data external to the inference engine is being sent from a double data rate (DDR) memory. At step 504, a first portion of the data at the first processing tile is received. At step 506, the first portion of the data is transmitted from the first processing tile to a second processing tile for temporary local storage, wherein the second processing tile is within the inference engine. It is appreciated that in some embodiments a low-level instruction code is generated to cause the first portion of the data to be transmitted from the first processing tile to the second processing tile if the amount of the data external to the inference engine is greater than available space within the first OCM. In some embodiments, the second OCM is partitioned, wherein one partition of the second OCM is designated to temporarily store data from a processing tile other than the second processing tile. In some embodiments, the first OCM may be partitioned. The partitioning may include a first partition configured to store static data, a second partition configured to store intermediate data generated during processing by the first processing tile, a third partition configured to store data associated with input or output to the first processing tile, and a fourth partition configured to temporarily store data from processing tiles other than the first processing tile.

It is appreciated that in some embodiments, the first portion of the data external to the inference engine is pushed from the first processing tile to the second processing tile in absence of a request from the second processing tile. It is appreciated that according to one nonlimiting example, subsequent to pushing the first portion of the data external to the inference engine from the first processing tile to the second processing tile, the first portion of the data external to the inference engine is pushed from the second processing tile to the first processing tile in absence of a request from the first processing tile. It is appreciated that in some embodiments, the first portion of the data external to the inference engine is pulled from the first processing tile by the second processing tile in absence of a request from the second processing tile. It is appreciated that according to one nonlimiting example, subsequent to pulling the first portion of the data external to the inference engine from the first processing tile by the second processing tile, the first portion of the data external to the inference engine is pulled from the second processing tile by the first processing tile in absence of a request from the first processing tile.

At step 508, the first portion of the data is stored at a second OCM of the second processing tile. At step 510, a second portion of the data is received at the first processing tile. At step 512, the second portion of the data is stored at the first OCM of the first processing tile. At step 514, the second portion of the data is processed at the first processing tile by at least a first processing element. At step 516, the first portion of the data is received at the first processing tile from the second processing tile prior to the first portion of data is needed by the first processing tile. It is appreciated that in some embodiments a low-level instruction code is generated to cause the first portion of the data to be transmitted from the second processing tile to the first processing tile if the amount of the data external to the inference engine is greater than available space within the first OCM.

At step 518, the first portion of the data is stored at the first OCM of the first processing tile. It is appreciated that the first portion of the data is received at the first processing tile from the second processing tile when space is available at the first OCM of the first processing tile for local storage.

It is appreciated that the embodiments are described with respect to the OCM of one tile receiving external data and upon determination that the amount of external data exceeds the available OCM storage space sending a portion of the external data to another OCM of another processing tile for illustrative purposes. However, the embodiments should not be construed as limited to only external data being received by one processing tile and thereafter being transmitted to another processing tile for local storage. For example, the excess data from the external data that is destined for a first OCM of a first processing tile may be sent directly from the external source, e.g., DDR, to another OCM of another processing tile instead of being transmitted to the first OCM of the first processing tile such that it can be temporarily stored there until it is needed by the first processing tile. As another example, intermediate data that is generated by one processing tile may exceed its available storage space (in the OCM of that processing tile). As such, a portion of the intermediate data (e.g., the excess data) is transmitted by that processing tile to another OCM of another processing tile for temporary storage. It is appreciated that the excess data for the intermediate data is sent back from the another processing tile to the processing tile that generated the intermediate data before that excess data is needed.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:
   a first processing tile comprising at least a first processing element and a first on-chip memory (OCM), wherein the first OCM of the first processing tile is configured to receive external data for local storage and for local accessing and processing by at least the first processing element; and
   a second processing tile comprising at least a second processing element and a second OCM,
   wherein a portion of the external data is transmitted from the first processing tile to the second processing tile for temporary local storage in the second OCM of the second processing tile if an amount of the external data is greater than an amount of available space within the first OCM of the first processing tile, and
   wherein the portion of the external data that is temporarily stored locally in the second OCM of the second processing tile is transmitted back to the first OCM of the first processing tile for local storage before the portion of the external data is needed by at least the first processing element.

2. The system of claim 1, further comprising a compiler configured to determine whether the amount of the external data is greater than the amount of available space within the first OCM of the first processing tile, wherein the compiler is further configured to generate a low-level instruction code to cause the portion of the external data to be transmitted from the first processing tile to the second processing tile if the amount of the external data is greater than the amount of available space within the first OCM of the first processing tile.

3. The system of claim 2, wherein the compiler is further configured to generate a low-level instruction code to cause the portion of the external data to be transmitted from the second processing tile to the first processing tile if the amount of the external data is greater than the amount of available space within the first OCM of the first processing tile.

4. The system of claim 3, wherein the compiler is an ahead of time (AOT) compiler, wherein the portion of the external data is pushed by the first processing tile to the second processing tile in absence of a request from the second processing tile, and wherein the portion of the external data is pushed by the second processing tile to the first processing tile in absence of a request from the first processing tile.

5. The system of claim 3, wherein the compiler is an ahead of time (AOT) compiler, wherein the portion of the external data is pulled from the first processing tile to the second processing tile in absence of a request from the second processing tile, and wherein the portion of the external data is pulled by the second processing tile to the first processing tile in absence of a request from the first processing tile.

6. The system of claim 2, wherein the compiler is further configured to generate a low-level instruction code to cause the portion of the external data to be transmitted from the first processing tile to the second processing tile if the amount of the external data is greater than the amount of available space within the first OCM of the first processing tile and if the second OCM of the second processing tile has enough amount of available space to accommodate temporary local storage of the portion of the external data.

7. The system of claim 2, wherein the compiler is further configured to perform a runtime compilation, and wherein the portion of the external data is pushed or pulled between the first processing tile and the second processing tile responsive to a request from a processing tile.

8. The system of claim 1, wherein the second OCM of the second processing tile is partitioned, and wherein one partition of the second OCM of the second processing tile is designated to temporarily store locally data from a processing tile other than the second processing tile.

9. The system of claim 1, wherein the external data is being sent from a double data rate (DDR) memory.

10. A method comprising:
    determining that an amount of data external to an inference engine to be transmitted for local storage and local accessing and processing by a first processing tile of the inference engine exceeds an amount of available space at a first on-chip memory (OCM) of the first processing tile;
    receiving a first portion of the data at the first processing tile;
    transmitting the first portion of the data from the first processing tile to a second processing tile for temporary local storage, wherein the second processing tile is within the inference engine;
storing the first portion of the data at a second OCM of the second processing tile;
receiving a second portion of the data at the first processing tile;
storing the second portion of the data at the first OCM of the first processing tile;
processing the second portion of the data at the first OCM of the first processing tile by at least a first processing element;
receiving the first portion of the data at the first processing tile from the second processing tile prior to the first portion of data is needed by the first processing tile; and
storing the first portion of the data at the first OCM of the first processing tile.

11. The method of claim 10, wherein the first portion of the data is received at the first processing tile from the second processing tile when an amount of space is available at the first OCM of the first processing tile for local storage.

12. The method of claim 10, further comprising generating a low-level instruction code to cause the first portion of the data to be transmitted from the first processing tile to the second processing tile if the amount of the data external to the inference engine is greater than the amount of available space within the first OCM of the first processing tile.

13. The method of claim 12, further comprising generating a low-level instruction code to cause the first portion of the data to be transmitted from the second processing tile to the first processing tile if the amount of the data external to the inference engine is greater than the amount of available space within the first OCM of the first processing tile.

14. The method of claim 10, further comprising:
pushing the first portion of the data external to the inference engine from the first processing tile to the second processing tile in absence of a request from the second processing tile; and
subsequent to pushing the first portion of the data external to the inference engine from the first processing tile to the second processing tile, pushing the first portion of the data external to the inference engine from the second processing tile to the first processing tile in absence of a request from the first processing tile.

15. The method of claim 10, further comprising:
pulling the first portion of the data external to the inference engine from the first processing tile by the second processing tile in absence of a request from the second processing tile; and
subsequent to pulling the first portion of the data external to the inference engine from the first processing tile by the second processing tile, pulling the first portion of the data external to the inference engine from the second processing tile by the first processing tile in absence of a request from the first processing tile.

16. The method of claim 10, further comprising partitioning the second OCM of the second processing tile, wherein one partition of the second OCM of the second processing tile is designated to temporarily store data locally from a processing tile other than the second processing tile.

17. The method of claim 10, wherein the data external to the inference engine is being sent from a double data rate (DDR) memory.

18. A system comprising:
a means for determining that an amount of data external to an inference engine to be transmitted for local storage and local accessing and processing by a first processing tile of the inference engine exceeds an amount of available space at a first on-chip memory (OCM) of the first processing tile;
a means for receiving a first portion of the data at the first processing tile;
a means for transmitting the first portion of the data from the first processing tile to a second processing tile for temporary local storage, wherein the second processing tile is within the inference engine;
a means for storing the first portion of the data at a second OCM of the second processing tile;
a means for receiving a second portion of the data at the first processing tile;
a means for storing the second portion of the data at the first OCM of the first processing tile;
a means for processing the second portion of the data at the first OCM of the first processing tile by at least a first processing element;
a means for receiving the first portion of the data at the first processing tile from the second processing tile prior to the first portion of data is needed by the first processing tile; and
a means for storing the first portion of the data at the first OCM of the first processing tile.

19. A system comprising:
a first processing tile comprising at least a first processing element and a first on-chip memory (OCM), wherein the first OCM of the first processing tile is configured to receive external data for local storage and for local accessing and processing by at least the first processing element; and
a second processing tile comprising at least a second processing element and a second OCM,
wherein a portion of the external data is transmitted from a memory component external to the first processing tile to the second OCM of the second processing tile for temporary local storage if an amount of the external data is greater than an amount of available space within the first OCM of the first processing tile, and
wherein the portion of the external data that is temporarily stored locally in the second OCM of the second processing tile is transmitted back to the first OCM of the first processing tile for local storage before the portion of the external data is needed by at least the first processing element.

20. A system comprising:
a first processing tile comprising at least a first processing element and a first on-chip memory (OCM), wherein the first OCM of the first processing tile is configured to store data locally and for local accessing and processing by at least the first processing element, wherein the first processing tile is configured to generate intermediate data, and wherein a portion of the intermediate data is transmitted from the first OCM of the first processing tile to a second OCM of a second processing tile for temporary local storage if an amount of the intermediate data is greater than an amount of available space within the first OCM of the first processing tile; and
the second processing tile comprising at least a second processing element and the second OCM of the second processing tile, wherein the portion of the intermediate data that is temporarily stored locally in the second OCM of the second processing tile is transmitted back to the first OCM of the first processing tile for local storage before the portion of the intermediate data is needed by at least the first processing element.

* * * * *